(12) United States Patent
Akbarpour et al.

(10) Patent No.: US 12,555,185 B2
(45) Date of Patent: Feb. 17, 2026

(54) FLEXIBLE MULTI-CAMERA FOCAL PLANE: A LIGHT-FIELD DYNAMIC HOMOGRAPHY APPROACH

(71) Applicants: Hadi Ali Akbarpour, Columbia, MO (US); Kannappan Palaniappan, Columbia, MO (US)

(72) Inventors: Hadi Ali Akbarpour, Columbia, MO (US); Kannappan Palaniappan, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 202 days.

(21) Appl. No.: 18/332,546

(22) Filed: Jun. 9, 2023

(65) Prior Publication Data

US 2024/0161232 A1 May 16, 2024

Related U.S. Application Data

(60) Provisional application No. 63/351,022, filed on Jun. 10, 2022.

(51) Int. Cl.
*G06T 3/4038* (2024.01)
*H04N 23/698* (2023.01)
*H04N 23/80* (2023.01)
*H04N 23/90* (2023.01)

(52) U.S. Cl.
CPC ......... *G06T 3/4038* (2013.01); *H04N 23/698* (2023.01); *H04N 23/80* (2023.01); *H04N 23/90* (2023.01)

(58) Field of Classification Search
CPC .... G06T 3/4038; H04N 23/698; H04N 23/80; H04N 23/90
See application file for complete search history.

(56) References Cited

U.S. PATENT DOCUMENTS

| | | | | | |
|---|---|---|---|---|---|
| 5,657,402 | A | * | 8/1997 | Bender | G06T 3/4038 382/284 |
| 2010/0103175 | A1 | * | 4/2010 | Okutomi | H04N 13/243 345/428 |
| 2017/0109856 | A1 | * | 4/2017 | Inazumi | G06T 7/73 |

OTHER PUBLICATIONS

Palaniappan, K., et al., "Wide-Area Persistent Airborne Video: Architecture and Challenges", Springer-Verlag London Limited 2011, pp. 349-371 (2011).

Leininger, B., et al., "Autonomous real-time ground ubiquitous surveillance-imaging system (ARGUS-IS)", Defense Transformation and Net-Centric Systems 2008, SPIE Proceedings, pp. 1-11 (2008).

(Continued)

*Primary Examiner* — Yogesh K Aggarwal
(74) *Attorney, Agent, or Firm* — Shook, Hardy & Bacon L.L.P

(57) ABSTRACT

A method is provided for using Light-Field Dynamic Homography (DH) to generate a large virtual focal plane from a non-rigid camera array with narrow overlaps between their fields of view (FOV). The method incorporates the 3D geometry of the cameras and employs non-linear least square optimization to dynamically estimate the inter-view homography transformations. Remarkably, only two feature correspondences are required between adjacent views to stitch the images and generate a wide virtual focal plane array, eliminating the need for significant FOV overlaps between the multiple cameras.

20 Claims, 6 Drawing Sheets

(56) References Cited

OTHER PUBLICATIONS

Wilburn, B., et al., "High performance imaging using large camera arrays", ACM Transactions on Graphics, vol. 24, No. 3, pp. 765-776, (2005).

Brady, D.J., et al., "Multiscale gigapixel photography", Nature, Macmillan Publishers Limited vol. 486, No. 7403, p. 386-389, (2012).

He, B., et al., "Panoramic video stitching in multi-camera surveillance system", 25th International Conference of Image and Vision Computing New Zealand, pp. 1-6 (2010).

Malis, E., et al., "Dynamic estimation of homography transformations on the special linear group for visual servo control", IEEE International Conference on Robotics and Automation, pp. 1-6 (2009).

Lai, W.S, et al., "Video stitching for linear camera arrays", British Machine Vision Conference 2019, BMVC 2019, pp. 1-12 (2019).

Zhou, H., et al., "Seamless stitching of large area uav images using modified camera matrix", Proceedings of the 2016 IEEE International Conference on Real-time Computing and Robotics (RCAR), pp. 561-566 (2016).

Ullah, H., et al., "Automatic 360 mono-stereo panorama generation using a cost-effective multi-camera system", Sensors, vol. 20, No. 11, pp. 1-22 (2020).

Lu, Y., et al., "Photometric calibration and image stitching for a large field of view multi-camera system", Sensors, vol. 16, pp. 1-12 (2016).

Hartley, R., and Zisserman, A., "Multiple view geometry in computer vision", Cambridge University Press, pp. 23-48 (2003).

Szeliski, R., "Image alignment and stitching: A tutorial", now the essence of knowledge, Tech. Rep. MSR-TR-2004-92, pp. 1-26 (Oct. 2004).

Brown, M., et al., "Minimal solutions for panoramic stitching", in 2007 IEEE CVPR, pp. 1-8 (2007).

Aliakbarpour, H., et al., "Parallax-Tolerant Aerial Image Georegistration and Efficient Camera Pose Refinement-Without Piecewise Homographies", IEEE Transactions on Geoscience and Remote Sensing, vol. 55, No. 8, pp. 1-20, (2017).

Aliakbarpour, H., et al., "Robust camera pose refinement and rapid StM for multiview aerial imagery—without RANSAC", IEEE Geoscience and Remote Sensing Letters, vol. 12, No. 11, pp. 2203-2207, (2015).

\* cited by examiner

FLEXIBLE MULTI-CAMERA FOCAL PLANE: A LIGHT-FIELD DYNAMIC HOMOGRAPHY APPROACH

STATEMENT REGARDING FEDERALLY SPONSORED RESEARCH OR DEVELOPMENT

This invention was made with government support under W911NF-18-2-0285 awarded by the Army Research Laboratory. The government has certain rights in the invention.

BACKGROUND

Computer vision is a rapidly advancing field that focuses on developing algorithms and techniques to enable machines to understand and interpret visual data. It encompasses a wide range of applications, including image and video analysis, object recognition, scene understanding, and augmented reality. Computer vision techniques have found applications in various domains, such as healthcare, autonomous vehicles, surveillance systems, robotics, and entertainment. The field draws from multiple disciplines, including mathematics, statistics, signal processing, and machine learning. Over the years, computer vision has witnessed significant progress, driven by advancements in hardware capabilities, such as faster processors and high-resolution cameras, as well as the availability of large-scale datasets and breakthroughs in deep learning algorithms. These advancements have opened up new possibilities for real-time image and video processing, enabling machines to perform complex visual tasks with remarkable accuracy and efficiency. As computer vision continues to evolve, it holds immense potential to revolutionize industries and enhance human-computer interaction by enabling machines to perceive, analyze, and make informed decisions based on visual information.

SUMMARY

At a high level, aspects described herein relate to a system and method for image stitching using a novel method called Light-Field Dynamic Homography (LDH) for generating a large virtual focal plane from a non-rigid camera array with narrow overlaps between their fields of view (FOV). Unlike traditional methods that rely on extensive FOV overlap, LDH requires only two feature correspondences between adjacent views, allowing for more flexibility in camera positioning. The method incorporates the 3D geometry of the cameras and utilizes non-linear least square optimization to estimate the inter-views transformations. Simulated experiments were conducted to evaluate the precision and integrity of the virtual focal plane formed by DH, considering factors such as required point correspondences, overlap between views, and the presence of radial distortion. The results demonstrate the superiority of the proposed 3D-based approach over traditional 2D methods, such as projective or affine homographies, and highlight its potential for remote sensing and Wide Area Motion Imagery (WAMI) applications. The robustness and repeatability of the findings further support the effectiveness of the DH method in creating seamless and wide-ranging composite images from non-rigid camera arrays.

This summary is intended to introduce a selection of concepts in a simplified form that is further described in the Detailed Description section of this disclosure. The summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
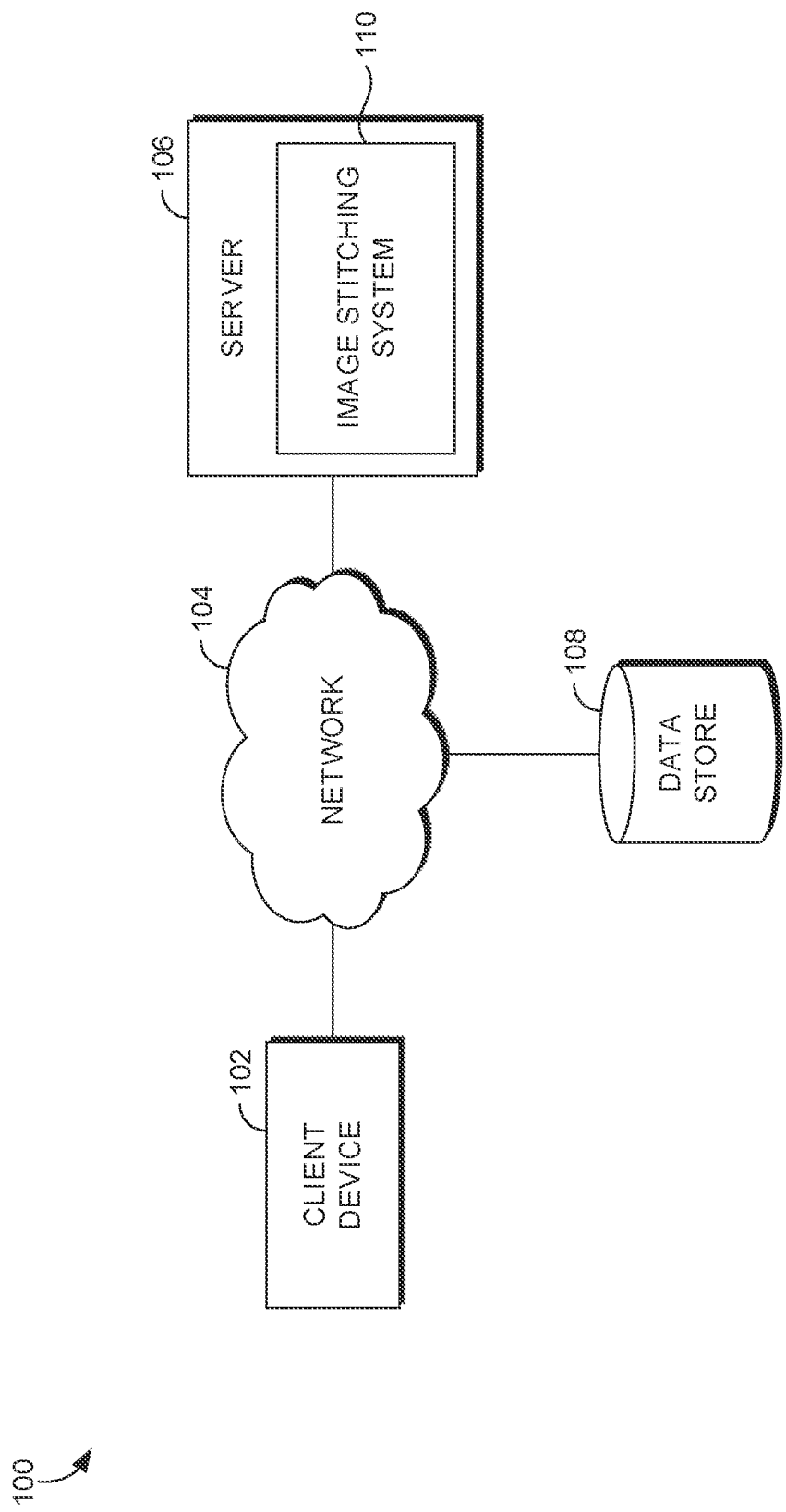
FIG. 1 is a block diagram of an example operating environment suitable for employing a image stitching system, in accordance with an aspect described herein.

Aspects herein describe a novel approach, for dynamic homography-based analytical multi-camera focal plane image stitching, Flexible Multi-Camera Focal Plane-Light-Field Dynamic Homography (FlexCam-LDH), to synthesize a virtual focal plane using a using a tiled-array of focal plane images collected by the corresponding array of multiple rigid or non-rigid cameras. The camera array itself could be statically deployed or mobile, on a single or multiple platforms. FlexCam-LDH supports accurate focal plane stitching even with extremely small image overlaps (i.e. a few percent or even smaller of a few lines of pixels) between adjacent or nearby cameras whose field-of-views (FOVs) overlap. The image transformation relationships between cameras can be direct or transitive, the latter being a sequence of projective transformations across a set of focal plane tiles. FlexCam-LDH estimates the inter-or between-camera view transformations using the underlying camera pose or orientation geometry, namely the relative angles and offsets between the local camera coordinate systems in 3D. FlexCam-LDH does not require a pre-camera calibration procedure, neither intrinsic nor extrinsic. In FlexCam-LDH, a novel and unsupervised calibration procedure is automatically performed in realtime on a frame-to-frame or as needed basis.

Aspects of FlexCam-LDH also include a fast and robust numerical optimization instantiation method to minimize the image-to-image registration errors using the feature correspondences in the different camera views from the tiled focal plane array. One key advantage of FlexCam-LDH is that it can work for a minimum of just two feature point correspondences between each adjacent pair of views, which dramatically relaxes the need to have a large degree of overlap in the camera FOVs. The output of FlexCam-LDH are the tiled focal plane registration transformations between cameras in the camera array, that are then used to create a single synthesized focal plane composed of stitched images from focal plane tiles associated with the cameras in the array. The synthesized camera array focal plane produced by FlexCam-LDH is equivalent to a several times larger image, compared to a single camera image, with a stable virtual camera model at every (synchronous or nearly synchronous) instance of time. FlexCam-LDH is equivalent to a virtual camera with a large focal plane array, where the size of the tiled focal plane array is nearly equal to the sum of the sizes of the individual focal plane sampling of the real cameras involved in the array since the overlaps are minimal (as small as a few pixels).

One practical application of FlexCam-LDH, among many, is using drones or manned aerial platforms for Wide Area Motion Imagery (WAMI) of large urban regions. A second application of FlexCam-LDH is for real-time dynamic camera calibration with self-driving vehicles for those cameras on the vehicles that have overlapping FOVs that simplifies and accelerates the traditional vision-based camera calibration techniques. A third application is for smartphones with multiple camera photo and 3D applications where the camera calibration parameters needed to create a stitched focal plane image may change over time and can be updated quickly using the FlexCam-LDH procedure. FlexCam-LDH can adapt to smartphone cameras with different focal lengths and different mounting positions and zoom settings as well as environmental changes such as temperature, humidity, vibration, and impacts.

The use of aspects described herein have many additional applications including biomedical tissue, cellular and subcellular microscopy, traffic monitoring along roadways and at intersections, law enforcement surveillance using aerial platforms. In the first application of FlexCam-LDH, WAMI sensing presents the challenge of projecting (georeferencing) many well resolved, often high ground sampling distance (GSD) pixels, covering a large ground area onto a world map. The most versatile WAMI systems cover areas of tens of square kilometers while providing the ability to digitally zoom into small areas while maintaining high resolution. Large WAMI systems require hundreds of megapixels to gigapixels and higher sensor array pixel resolution. Achieving giga-pixel resolution image or video streams requires the use of multiple cameras mounted in arrays to produce a large virtual camera stitched image covering the geographical area of interest.

For example, a nine camera array sensor mounted on a single platform configured in a 3 by 3 grid with small image FOV overlaps between adjacent cameras in the array. Stitching the focal plane tiled imagery between cameras in the camera array requires precise subpixel-level alignment, and such focal plane registration generally requires rigid mounts and well-controlled camera geometries. This can require expensive and time-consuming manufacturing processes, such as precision instrument camera mounts that are precisely milled out of a single billet of metal, as well as lenses that are specially engineered to ensure constant focal parameters. Most importantly, the rigid mounting requirement greatly increases the cross-sectional area required for large camera arrays, with potentially negative effects on the lift properties of an aircraft. By relaxing the requirement for rigid precise camera alignment, new designs for large camera gimbal systems are made possible by using the FlexCam-LDH technology. This includes streamlined designs in which cameras can be configured inside long, narrow pods or built into longitudinal aircraft structures. The cameras can have imprecise articulation in which alignment is constantly changing.

Furthermore, less expensive, lighter commercial lenses can be used that are not designed for high thermal stability. Camera arrays can be built to arbitrary scales, and they can be placed into structures that are cheaper, lighter, and well-suited for aerospace or space borne uses, such as carbon fiber and many plastics. It relaxes the need for mechanical precision camera alignment by computing the stitching parameters analytically on a frame-by-frame basis in real time with a computational process instantiation. The output of FlexCam-LDH is a real-time gigapixel resolution image or video stream. Another application of FlexCam-LDH in aerial imagery is to use it as a dynamic distributed-aperture airborne camera using a collective or group of (small) UAVs. FlexCam-LDH can be implemented as a cluster of coordinated U A Vs/drones to collectively operate as a distributed high-resolution airborne camera unit. The formation of the drones within the cluster is flexible. In this case, FlexCam-LDH can be used to coordinate and synthesize the merged image using the dynamically configurable array of sensors, providing a seamless image composition of a large area of interest with an optimum coverage and minimizing occlusions due to large structures or temporal gaps for tracking objects like vehicles and pedestrians.

FlexCam-LDH has several key advantages of prior existing technological solutions. The system provides advanced flexibility because cameras are not required to be rigidly mounted. Reconfigurability of the system is provided as the spatial arrangement or formation of the cameras can be dynamically changed. One or multiple cameras can be on one or multiple moving vehicles (e.g. UAVs). Efficiency is improved because the system requires only a very small overlap between the FOYs of the adjacent cameras (maximizing the pixel utilization in the stitched image mosaic) with only two point correspondences which is the minimum possible solution.

The FlexCam-LDH provides Plug-and-play advantages. No pre-calibration of the cameras is needed. In addition, FlexCam-LDHautomatically and in real-time finds the optimal camera parameters (their focal length, radial distortion parameters, relative offsets, etc.) on a frame-to-frame basis at each instance of time. Downstream processing pipeline is also achieved. The output of FlexCam-LDH, the stitched large focal plane (image), can be used as the input images to a Structure-from-Motion algorithm, motion analysis algorithm and to dense 3D reconstruction algorithms such as VB3D and VCCT since projective relationships between image points (pixels) observed by the individual cameras are preserved in the newly formed virtual focal plane.

Having provided some example scenarios, a technology suitable for performing these examples is described in more detail with reference to the drawings. It will be understood that additional systems and methods for matching images can be derived from the following description of the technology.

Turning now to FIG. 1, FIG. 1 illustrates a block diagram of example operating environment 100 in which implementations of the present disclosure may be employed. In particular, FIG. 1 illustrates a high-level architecture of operating environment 100 having components in accordance with implementations of the present disclosure. The components and architecture of FIG. 1 are intended as examples, as noted toward the end of the Detailed Description.

Among other components or engines not shown, operating environment 100 includes client device 102. Client device 102 is shown communicating using network 104 to server 106 and datastore 108. Server 106 is illustrated as hosting aspects of image stitching system 110.

Client device 102 may be any type of computing device. One such example is computing device 600 described with reference to FIG. 6. Broadly, however, client device 102 can include computer-readable media storing computer-executable instructions executed by at least one computer processor.

Client device 102 may be operated by any person or entity that interacts with server 106 to employ aspects of image stitching system 110. Some example devices suitable for use as client device 102 include a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

Client device 102 can employ computer-executable instructions of an application, which can be hosted in part or in whole at client device 102, or remote from client device 102. That is, the instructions can be embodied on one or more applications. An application is generally capable of facilitating the exchange of information between components of operating environment 100. The application may be embodied as a web application that runs in a web browser. This may be hosted at least partially on a server-side of operating environment 100. The application can comprise a dedicated application, such as an application having analytics functionality. In some cases, the application is integrated into the operating system (e.g., as a service or program). It is contemplated that "application" be interpreted broadly.

As illustrated, components or engines of operating environment 100, including client device 102, may communicate using network 104. Network 104 can include one or more networks (e.g., public network or virtual private network "VPN") as shown with network 104. Network 104 may include, without limitation, one or more local area networks (LANs) wide area networks (WANs), or any other communication network or method.

Server 106 generally supports image stitching system 110. Server 106 includes one or more processors, and one or more computer-readable media. One example suitable for use is provided by aspects of computing device 800 of FIG. 8. The computer-readable media includes computer-executable instructions executable by the one or more processors. The instructions may optionally implement one or more components of image stitching system 110, which will be described in additional detail below with reference to FIG. 2. As with other components of FIG. 1, while server 106 is illustrated a single server, it can include one or more servers, and various components of server 106 can be locally integrated within the one or more servers or may be distributed in nature.

Operating environment 100 is shown having datastore 108. Datastore 108 generally stores information including data, computer instructions (e.g., software program instructions, routines, or services), or models used in embodiments of the described technologies. Although depicted as a single component, datastore 108 may be embodied as one or more datastores or may be in the cloud. One example of datastore 108 includes memory 612 of FIG. 6.

Having identified various components of operating environment 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether.

Figure 2:
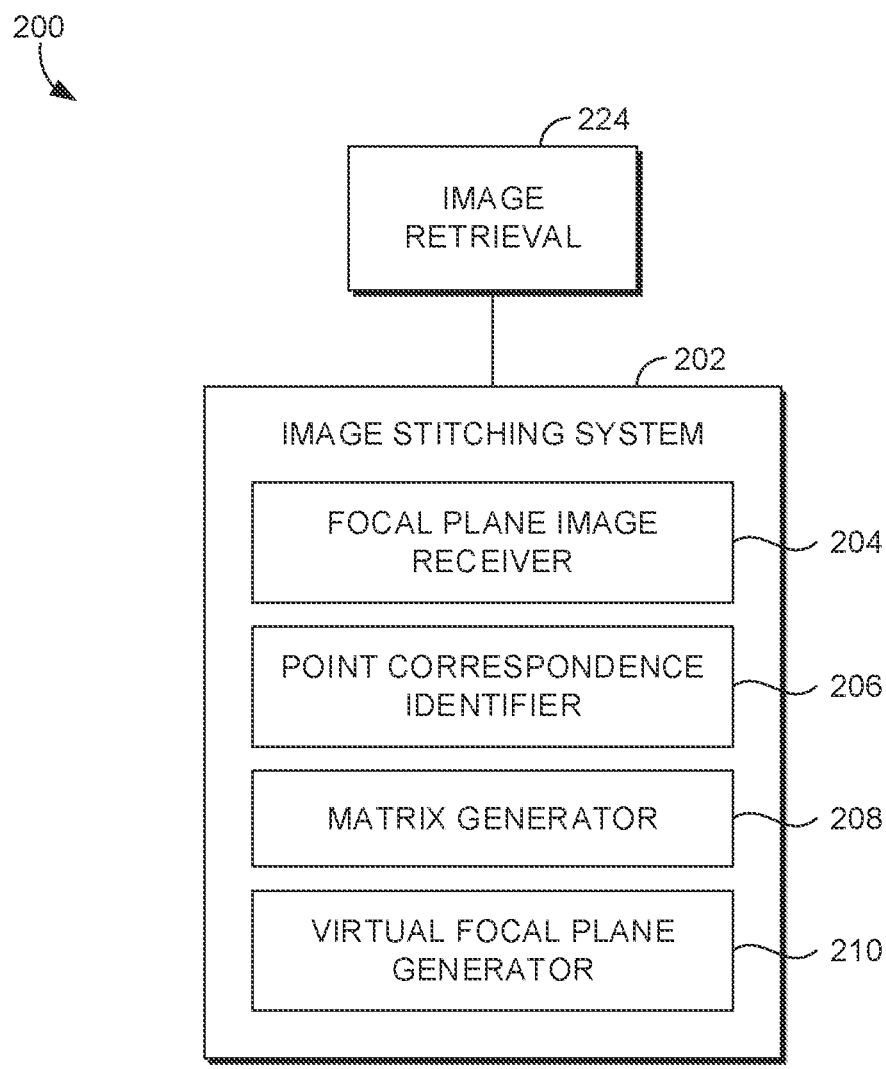
FIG. 2 is a block diagram of an example image stitching system, in accordance with an aspect described herein.

With regard to FIG. 2, an example image stitching system 200 is provided. Image stitching system 200 is suitable for use as image stitching system 110 of FIG. 1. Many of the elements described in relation to FIG. 2 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

As illustrated in FIG. 2, image stitching system 200 includes image stitching system 202. Image stitching system 202 generally identifies two points within an overlapping portion of two images the correspond to each other and stitches those images together To do so, image stitching system 202 employs focal plane image receiver 204, point correspondence identifier 206, matric generator 208, and virtual focal plane generator 210. As illustrated, image stitching system 202 generally stitches two or more images together to create a single virtual focal plane or a single image. To do so, the image stitching system 202 communicates with focal plane image receiver 204 to retrieve images or reference images from the two or more cameras used within the system.

Point correspondence identifier 206 is generally configured to perform tasks related to detecting overlapping portions of adjacent image field of views and identifying feature correspondences between those adjacent pairs of vies. Point correspondence identifier 206 may identify feature correspondences between adjacent pairs of views using any number of methods. Point correspondence identifier 206 may use for example, feature based methods, optical flow methods, structure from motion methods, deep learning methods, or other methods and systems that may be employed to identify points and features that correspond within a set of overlapping images.

Point correspondence identifier 206 generally identifies image patches within the first image or reference image. To do this the point correspondence identifier 206 may use methods related to identifying points within an image through the use of feature detectors both traditional handcrafted, such as Feature-based methods that rely on the detection and extraction of distinctive features from each image. These features are often represented by local descriptors, which encode information about their appearance and local neighborhood. Some descriptors include scale invariant feature transform (SIFT), speeded-up robust features (SURF), ORB (Oriented FAST and Rotated BRIEF), and BRISK (Binary Robust Invariant Scalable Keypoints).These methods involve extracting points from an image and may include an associated feature descriptor that is invariant to scale, rotation, and illumination changes like SIFT or SURF.

To match features, the descriptors of corresponding features from different views are compared. Various matching techniques can be used, such as nearest neighbor matching or ratio test. Nearest neighbor matching involves comparing the distance between feature descriptors and selecting the closest match as the correspondence. The ratio test helps to filter out ambiguous matches by considering the ratio of distances between the closest and second-closest matches. Only matches with a significant distance ratio are considered valid correspondences.

The point correspondence identifier 206 uses may also use an optical flow algorithm which estimates the displacement of pixels between consecutive frames. For matching features across adjacent views, the optical flow field is calculated by analyzing the pixel intensity changes between the images. The correspondence between features is established by finding pixels with similar motion vectors. In one embodiment, dense optical flow algorithms, such as Lucas-Kanade or Horn-Schunck, estimate motion vectors for every pixel in the image. Once the optical flow field is computed, features detected in one image can be tracked by searching for pixels with similar motion vectors in the next image. The similarity is measured based on metrics like Euclidean distance or normalized cross-correlation. If the motion vectors are consistent and fall within a certain threshold, a match is considered.

The point correspondence identifier 206 may also use Structure-from-Motion (SfM) techniques. SfM techniques estimate the 3D structure and camera poses of a scene from a set of images. Correspondences between features across adjacent views are established indirectly through the SfM process. In one embodiment, common features are identified across the entire image set using feature detection methods like SIFT or SURF. Once these features are detected, their descriptors are extracted. SfM algorithms utilize geometric constraints, such as epipolar geometry and triangulation, along with camera calibration information, to estimate the 3D structure and camera poses. During this process, correspondences between the detected features in adjacent views are inferred by matching their descriptors based on geometric constraints.

In a further embodiment, the point correspondence identifier 206 may use deep learning approaches to identify and match features within overlapping views. Deep learning approaches for feature correspondence matching leverage the power of Convolutional Neural Networks (CNNs) to learn discriminative feature representations. The matching process involves training the network on a large dataset of images with ground truth correspondences. CNN-based methods typically consist of Siamese or Triplet networks. Siamese networks take a pair of feature descriptors as input and output a similarity score, indicating the likelihood of the descriptors being a match. Triplet networks incorporate a third descriptor, aiming to learn embeddings such that the distance between matching descriptors is minimized, while the distance between non-matching descriptors is maximized. During training, the network learns to extract features that are invariant to variations and can discriminate between matches and non-matches. Once trained, the network can be applied to extract feature descriptors from images and compare them to establish correspondences.

In embodiments related to matrix generator 208 a Light Field Reprojection Dynamic Homography (DH) method is used. The matrix generator 208 uses a pinhole camera model where a 3D point $X_j$ identified by the point correspondence identifier 206 is expressed in a global reference frame $\{W\}$ and is projected (homogeneous) to the image plane of camera $C_i$, in equation 1.

$$\widetilde{x_{i,j}} = K_i(R_i X_j + t_i) \tag{1}$$

In embodiments, equation 1 uses terms where $R_i$, is a 3×3 matrix and $t_i$, is a 3×1 vector respectively representing the rotation and translation from $\{W\}$ to $\{C_i\}$, and $K_i$, is the camera calibration (intrinsic) matrix defined in equation 2.

$$K_i = \begin{bmatrix} f_i & 0 & u_i \\ 0 & f_i & v_i \\ 0 & 0 & 1 \end{bmatrix} \tag{2}$$

Equation 2 defines a matrix where $f_i$ is the focal length (in pixels), and $(u_i, v_i)$ are the principal points of $C_i$. A projective Homography is a 3×3 transformation matrix which provides a direct mapping between the 2D coordinates of the images of a common 3D plane (in the scene) observed by two cameras located at arbitrary locations and orientations. The homography transformation mapping the images of a 3D point $X_j$, lying on an Euclidean plane, it, from the image $I_2$ (of camera $C_2$) to the $I_1$ (of camera $C_1$), is expressed by $\tilde{x}_{1,j} = H_{2 \to 1}{}^\pi \tilde{x}_{2,j}$, where $\tilde{x}_{1,j}$ and $\tilde{x}_{2,j}$, are the 2D homogeneous coordinates of the images of $X_j$ on $I_1$ and $I_2$, respectively. $(\tilde{x}_{1,j}, \tilde{x}_{2,j})$ is called as a pair of correspondences, or a pair of matches, corresponding to $X_j$. The homography $H_{2 \to 1}$, induced by plane $\pi$ is analytically defined by equation 3.

$$H^\pi = K_1 \left( R_{2 \to 1} + \frac{1}{d} n t_{2 \to 1}^T \right) K_2 \tag{3}$$

According to equation 3, $K_1$ and $K_2$ are respectively the intrinsic parameters of the two cameras, and $R_{2 \to 1} = R_1 R_2^T$ and $t_{2 \to 1} = -R_{2 \to 1} t_2 + t_1$, and n is the normal of plane $\pi$ expressed in $\{C_1\}$, and d is the euclidean distance between $\pi$ and the center of $C_2$. This homography is valid only for the specific plane it. In one embodiment, such a homography matrix is not calculated from its analytical form, as the involved parameters, such as the relative transformation between the two cameras and the plane 3D geometry, are not generally available. Instead, its eight elements (normalized to its 9th element due to being up to a scale, yielding to eight Degree Of Freedom-DOF).

$$H = \begin{bmatrix} h_1 & h_2 & h_3 \\ h_4 & h_5 & h_6 \\ h_7 & h_8 & 1 \end{bmatrix} \tag{4}$$

The matrix described in equation 4 is estimated through a Direct Linear Transform method given a set of feature point correspondences identified by the point correspondence identifier 206. In some examples affine homography, is used which ignores the perspective components and has 6-DOF.

In one embodiment, where the underlying scene is relatively far from the cameras, where distance approaches infinity, and/or the translation between the two camera coordinate systems is negligible, equation 3 becomes simplified to equation 5.

$$H_{2 \to 1}{}^\infty = H_{2 \to 1} = K_1 R_{2 \to 1} K_2^{-1} \tag{5}$$

In one embodiment an infinite homography is used, and has only has 3-DOF in terms of the extrinsic parameters. In multi-camera rigs in remote sensing and WAMI applications, the mentioned criteria (i.e. d→∞ and/or t→$0_{3\times1}$) are held, allowing to use the infinite homography with a reduced number of parameters. Estimating the 3D rotation matrix $R_{2\to1}$ between two camera coordinates, which only includes 3-DOF, is significantly more stable and robust than estimating a full 8-DOF homography, or even its 6-DOF form. This embodiment has a reduced number of parameters and also to the ability to enforce the right constraints (only a 3-DOF rotation between two cameras) that matches the geometry of the cameras in their physical setup (model based). This embodiment prevents estimating other unnecessary constraints (additional 5-DOF in the case of perspective and extra 3-DOF in the case of affine) that do not correspond to the actual geometric model. The feature correspondences between the two views do not need to be spatially well distributed over the two image frames. This embodiment functions with 1% overlap between the FOVs with as low as only two feature point correspondences over the narrow intersected stripe, such as overlapping portion 306 shown in FIG. 3. This maximizes pixel utilization in an UAV remote sensing setup.

In a further embodiment, the three rotation angles (axis-angle representation) between two cameras are shown in equation 6. The system uses Equation 6 to analytically construct the corresponding homography matrix $H=K_1RK_2^{-1}$, as described equation 7.

$$r_{3\times1}=[\theta_1\ \theta_2\ \theta_3]^T \quad (6)$$

$$R_{3\times3}=\mathcal{R}(r_{3\times1}) \quad (7)$$

In equation 7, $\mathcal{R}$ is a function which converts an axis-angle rotation vector to a rotation matrix. In one example, a Rodrigues formula is used to convert. An estimate with a few degrees error tolerance, of the angles, r̂, is available. A non-linear least squares (NLS) optimization is used to refine and optimize the rotation angles. Assume to have m feature correspondences (homogeneous) between the two images, $\{(\tilde{x}_{1,j}, \tilde{x}_{2,j})|j=1\ldots m\}$, the following cost function is defined in equation 8.

$$e_j=\|\Pi(\tilde{x}_{2,j})-\Pi(H\tilde{x}_{1,j})\| \quad (8)$$

In equation 8, $e_j$ represents the Euclidean distance in pixels between the jth feature point $(x_1,j)$ on the image plane $I_1$ (of $C_1$) and its pair $(x_{2,j})$ on $I_2$ (of $C_2$) after mapping to $I_1$ using the analytical homography shown in equation 9.

$$H=K_1\mathcal{R}(\hat{r})K_2^{-1} \quad (9)$$

In Equation 8, $\Pi(\tilde{x})$ is a non-linear function that normalize a homogeneous vector to its 2D euclidean form. In this embodiment the NLS can defined as equation 10.

$$r = \underset{\hat{r}}{\mathrm{argmin}}\sum_{j=1}^{m}\left\|\prod(\tilde{x}_{1,j}) - \prod(K_1\mathcal{R}(\hat{r})K_2^{-1}\tilde{x}_{2,j})\right\|^2 \quad (10)$$

In further embodiments, the matrix generator 208 uses an iterative non-linear solver such as Levenberg Marquardt may be used to find an optimum rotation vector r, while minimizing the errors between all pairs of feature correspondences.

Moving now to virtual focal plane generator 210. Once the matrix generator 208 identifies the minimum errors between the pairs of feature correspondences, the focal plane generator may then align the features. The correspondences identified by the matrix generator provide information about the position and orientation of the features in both images. By estimating the transformation (e.g., translation, rotation, scaling) between the images, the features can be brought into spatial alignment. The present disclosure generally uses homography estimation.

Once the alignment is established, image warping is performed to map the pixels of one image onto the coordinate system of the other. This process ensures that the matched features are perfectly aligned. The transformation estimated in the previous step is used to compute the pixel correspondences between the images, and the pixel intensities are interpolated to generate the warped image. Techniques such as bilinear or bicubic interpolation are commonly used for this purpose.

When the virtual focal plane generator 210 is stitching together the warped images, it's crucial to ensure smooth transitions between them to create a seamless composite. This involves blending the overlapping regions where the images are stitched. Various blending techniques can be employed, such as feathering, alpha blending, or multi-band blending. The goal is to eliminate visible seams and create a natural transition between the images. Additionally, advanced methods can be used to handle exposure variations, color inconsistencies, or perspective distortions that may arise during the stitching process.

In some embodiments, the virtual focal plane generator 210, after blending and seam removal, generates the final composite image. This composite combines the aligned and blended images to create a larger field of view that covers both original images. The virtual focal plane generator ensures that the stitched image appears as a coherent and continuous view, as if captured by a single camera with a larger field of view.

Figure 3:
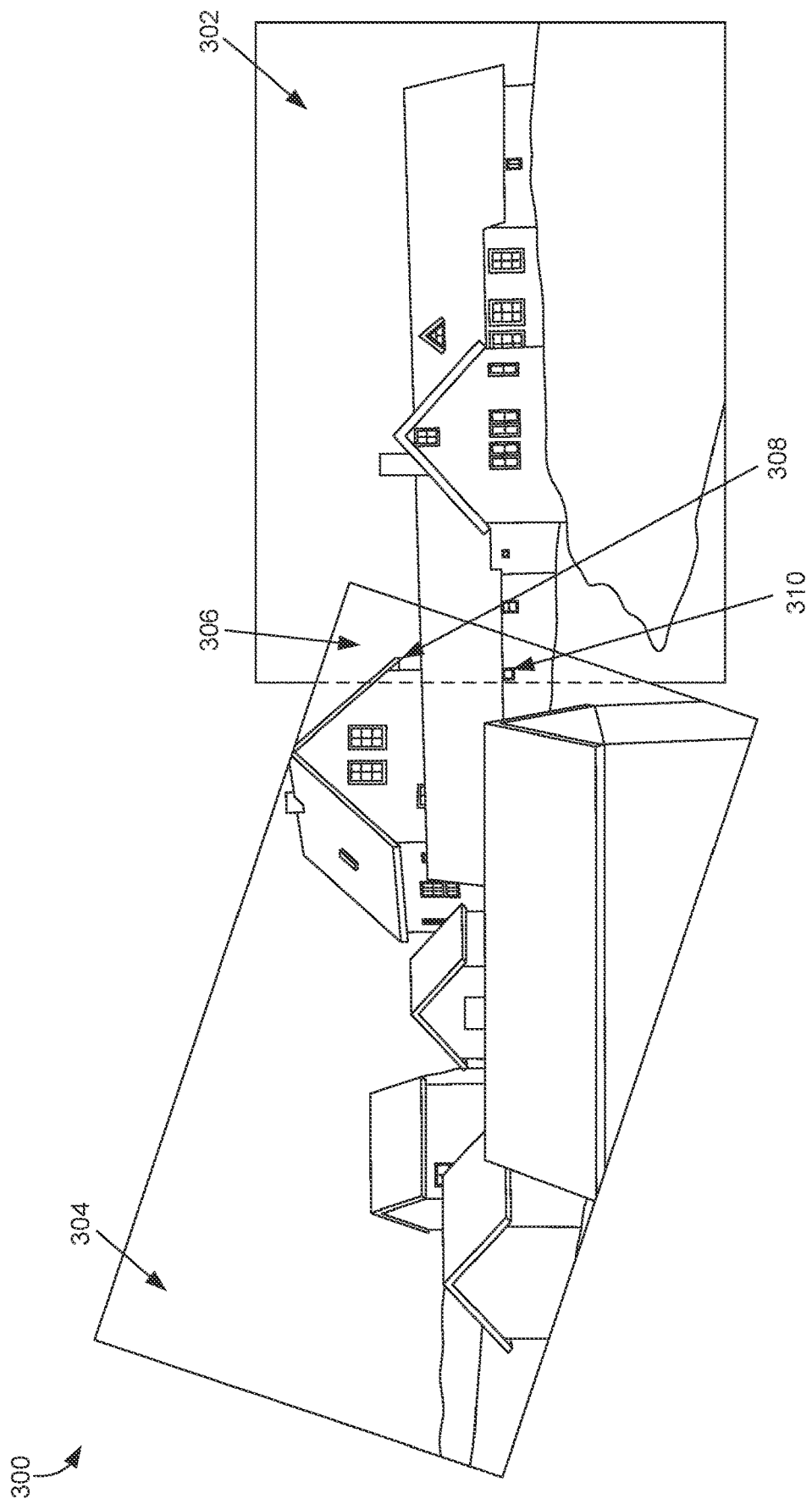
FIG. 3 is an illustration of the image stitching system of FIG. 2, for a two camera imaging system after alignment, in accordance with an aspect described herein.

Turning now to FIG. 3, an illustration is provided of an example image stitching using image stitching system 300 of FIG. 2. Reference is now made to both FIG. 2 and FIG. 3. With regard to FIG. 3, an example image stitching system 300 is provided. Image stitching system 300 is suitable for use as image stitching system 110 of FIG. 1. Many of the elements described in relation to FIG. 3 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

As illustrated in FIG. 3, provides an illustration of a sample image stitching that includes a first image 302, a second image 304, and overlapping portion 306, and a set of feature points 308 and 310. As described with reference to the image stitching system of FIG. 2, the system identifies two adjacent images such as first image 302 and second image 304. The system may then identify an overlapping portion 306. From there, the system may identify two or more image features within the overlapping portion 306 that are common to both images 302 and 304. These feature points 308 and 310 are identified and used by the matrix generator 208 to help generate a stitched together virtual focal plane image.

In some embodiments, the first image 302 and the second image 304 have radial distortion. In presence of radial distortion, the projection model has to be updated. The radial distortion model used herein uses three radial coefficients of $k_1$, $k_2$ and $k_3$. A 3D point $X_j$ to be projected on the image plane of camera $C_i$, is first transformed into the local coordinate of $C_i$ by $X_j^i=R_iX_j+t_i$. In a radial distortion model, 3D point $X_j$ observed by the camera is first projected onto the plane $Z=1$ (in its locate coordinate). The distance between their projected positions on this plane and the center of projection is known as radial distance and is defined by equation 11.

$$r_{i,j}^2 = \frac{\|X_j^i\|^2}{\|\hat{k} \circ X_j^i\|^2} - 1 \quad (11)$$

With respect to equation 11, $\hat{k}=[001]^T$ and $\circ$ denotes the Hadamard product (element-wise multiplication). The amount of perturbation of point $X_j^i$ in the presence of radial distortion is proportional to its radius distance $r_{i,j}$ and the camera's radial coefficient of $k_{1,i}$, $k_{2,i}$ and $k_{3,i}$ and defined by a scalar function known as distortion factor shown in equation 12.

$$d_{i,j}=1+k_{1,i}r_{i,j}^2+k_{2,i}r_{i,j}^4+k_{3,i}r_{i,j}^6. \quad (12)$$

The 3D distorted coordinates of $X_j^i$ is obtained by the following distortion function shown in equation 13.

$$\mathcal{D}_i(X_j^i) = \begin{bmatrix} d_{i,j} \\ d_{i,j} \\ 1 \end{bmatrix} \circ X_j^i \quad (13)$$

The projection model in the presence of the radial distortion becomes equation 14, which will be used to project 3D points from the point cloud to the camera focal plane for the purpose of generating image observations.

$$\tilde{x}_{i,j}=K_i\mathcal{D}_i(R_iX_j+t_i) \quad (14)$$

In additional embodiments, the first image 302 and the second image 304 become distorted. To account for this distortion, the feature points 308 and 310 are replaced by Equation 15.

$$s = \underset{\hat{s}}{\operatorname{argmin}} \sum_{(p,q)\in\mathcal{L}} \sum_{j=1}^{m_{p,q}} \left\| \prod(\mathcal{U}_q([x_{q,j}1]^T))- \prod(K_q\mathcal{R}(\hat{r}_{p,q})K_p^{-1}\mathcal{U}_p(\tilde{x}_{p,j}))\right\|^2 \quad (15)$$

Figure 4:
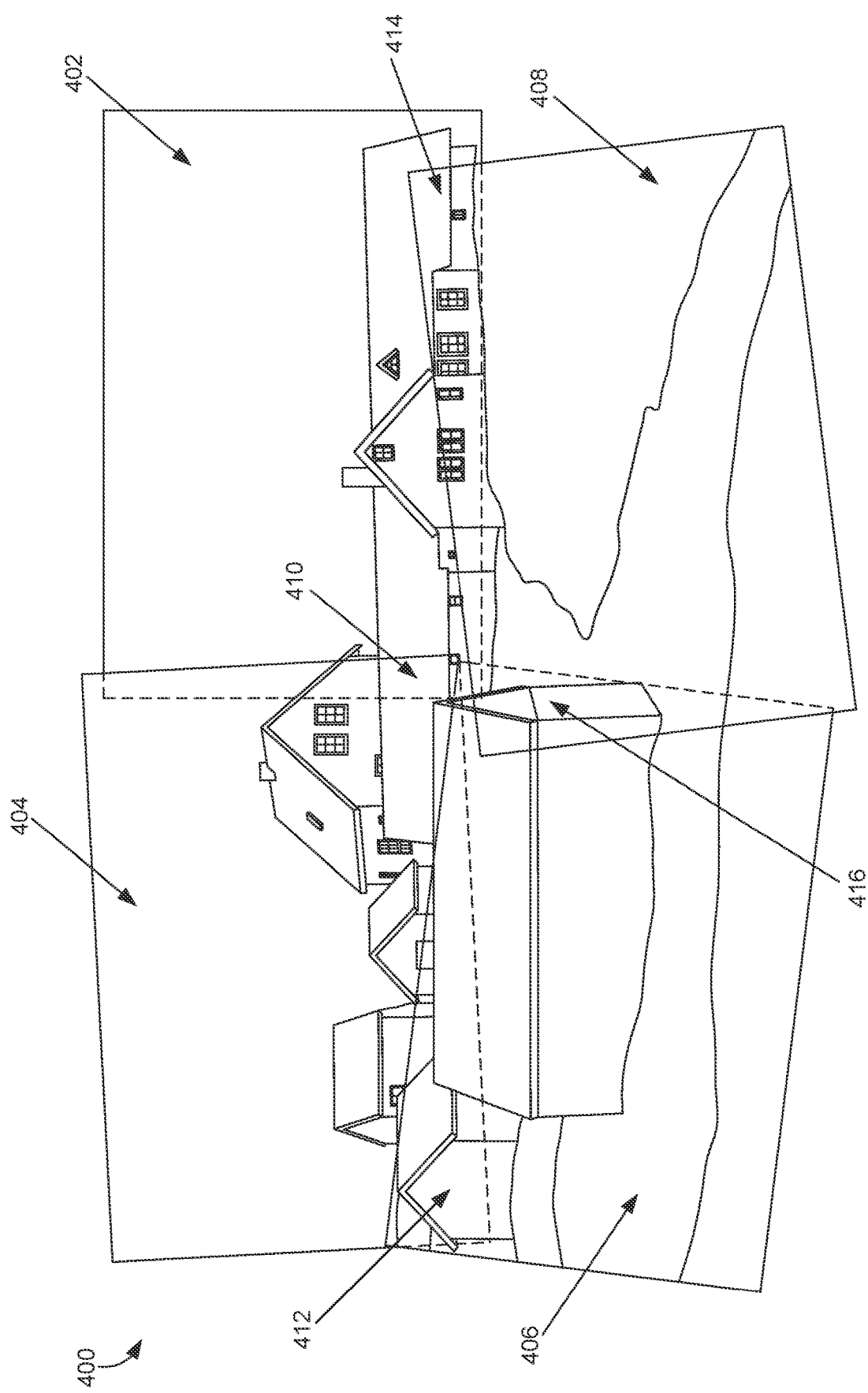
FIG. 4 is an illustration of the image stitching system of FIG. 2, for a four camera imaging system after alignment, in accordance with an aspect described herein.

Turning now to FIG. 4, an illustration is provided of an example image stitching using image stitching system 200 of FIG. 2. Reference is now made to both FIG. 2 and FIG. 4. With regard to FIG. 4, an example image stitching system 400 is provided. Image stitching system 400 is suitable for use as image stitching system 110 of FIG. 1. Many of the elements described in relation to FIG. 4 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

As illustrated in FIG. 4, provides an illustration of a sample image stitching system 400 that includes a first image 402, a second image 404, a third image 406, a fourth image 408, a first overlap 410, a second overlap 412, a third overlap 414, and a fourth overlap 416. As described with reference to the image stitching system of FIG. 2, the system identifies two adjacent images such as first image 402 and second image 404. The system may then introduce two more cameras to extend to a four camera setup. Each camera that generates the images herein are non-rigidly mounted on a gimbal in such a way that there is a narrow overlap of their fields of view between adjacent pairs of images. Such overlaps may be a first overlap 410, a second overlap 412, a third overlap 414, and a fourth overlap 416. The transformations between the camera references are defined by their relative rotations. These relative rotations are not constant and at every moment they can freely change (for different purposes such as accommodating the mechanical constraint). With no loss of generality, the first image is defined as a reference image and is hereinafter labeled TR.

In some embodiments, there might be no direct FOV overlap between the third image 406 (BL) and the first image 402 (TR), a direct cost function between them cannot be defined to optimize their relative angles and consecutively their homography $H_{BL \to TR}$. The present disclosure addresses this by simply defining two transitivity relations to connect the third image 406 to the first image 402. The optimization model is defined in equation 16.

$$S = \underset{\hat{S}}{\operatorname{argmin}} \sum_{(p,q)\in\mathcal{L}} \sum_{j=1}^{m_{p,q}} \left( \prod(\tilde{x}_{q,j})- \prod(K_q\mathcal{R}(\hat{r}_{p,q})K_p^{-1}\tilde{x}_{p,j})\right)^2 \quad (16)$$

In equation 15, $\mathcal{L}$ is the set of all overlapping pairs of views, as shown in equation 16. Further, the third image 406 is represented as TL and the fourth image 408 is represented as BR and may be used interchangeably. In equation 16, $m_{p,q}$ denotes the number of point (feature) correspondences between the overlapping views of $C_p$ and $C_q$, and S contains the set of parameters to be optimized. Once optimized, the final homography matricies are shown in equation 18.

$$\mathcal{L}=\{(TL, TR), (TL, BL), (BL, BR), (BR, TR)\} \quad (17)$$

$$\begin{cases} H_{TL \to TR} = K_{TR}\mathcal{R}(\hat{r}_{TL,TR})K_{TL}^{-1} \\ H_{BL \to TR} = K_{TR}\mathcal{R}(\hat{r}_{TL,TR})\mathcal{R}(\hat{r}_{BL,TL})K_{BL}^{-1} \\ H_{BR \to TR} = K_{TR}\mathcal{R}(\hat{r}_{BR,TR})K_{BR}^{-1} \end{cases} \quad (18)$$

Thus, four images are able to be stitched together using only 2 feature points between each image and no overlap between the reference image and the opposite image.

Figure 5:
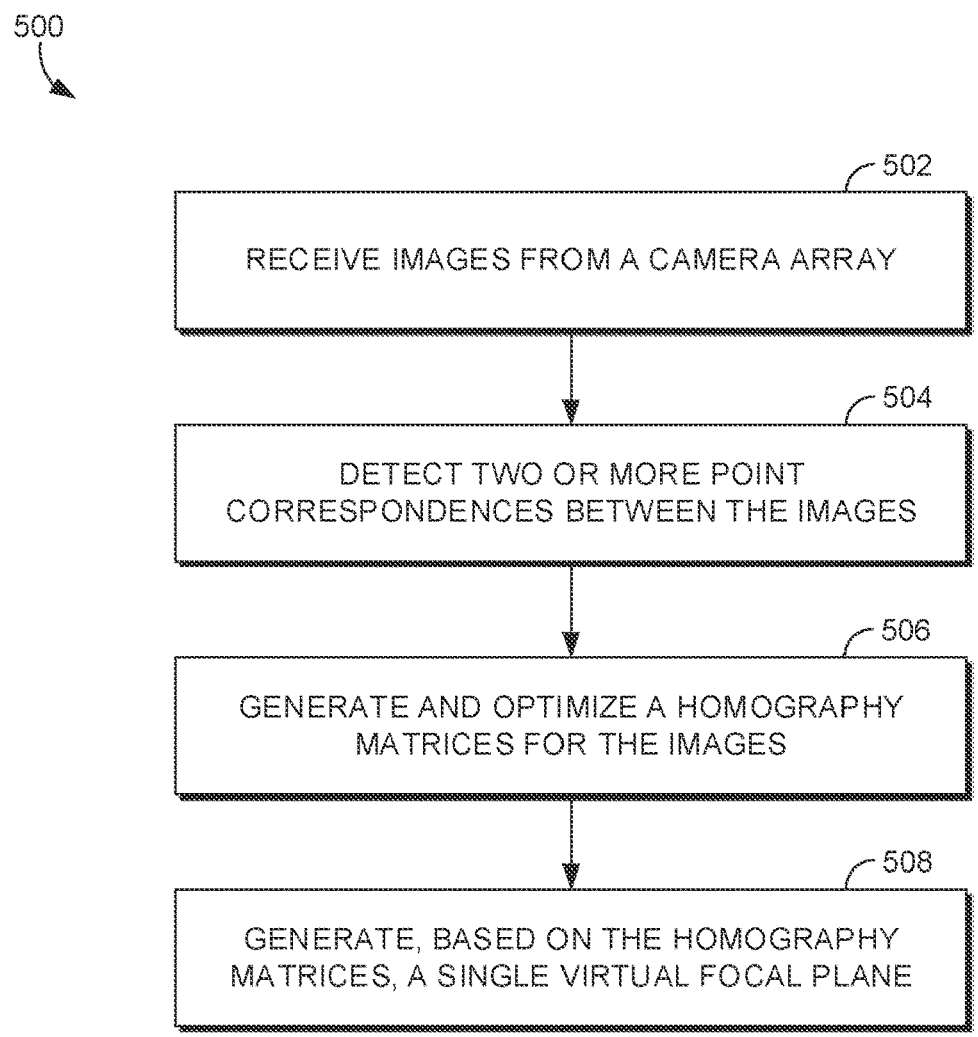
FIG. 5 is a block diagram illustrating an example method for image matching in accordance with an aspect described herein.

Regarding FIG. 5, a block diagram is provided to illustrate a method for matching images. The methods may be performed using the image stitching system 202. In embodiments, one or more computer storage media having computer-executable instructions embodied thereon that, when executed, by one or more processors, cause the one or more processors to perform the methods. The method may be part of computer-implemented methods implemented by systems that include computer storage media and at least one processor. It will be recognized that the methods described within FIG. 5 is an example method and that other methods can and will be derived from the described technology.

The method 500 begins by receiving a first and a second image from a camera array at block 502. The camera array may comprise multiple cameras placed in a specific configuration to capture different perspectives of the scene. Block 502 may further comprise acquiring the first and second images from the camera array. Each camera in the array captures an image from its respective viewpoint. The synchronization of image acquisition is essential to ensure that the images correspond to the same moment in time. This can be achieved through hardware synchronization mechanisms, such as triggering all cameras simultaneously or using a global shutter to capture images at the exact same instant. The acquired images may have some inherent variations due to differences in camera characteristics, exposure settings, or lens distortions.

Further at block 502, before utilizing the images for further processing, camera calibration is typically performed. Camera calibration involves estimating the intrinsic and extrinsic parameters of each camera in the array. The intrinsic parameters include focal length, principal point, and lens distortion parameters, while the extrinsic parameters define the camera's position and orientation in the 3D space. Calibration is necessary to accurately determine the correspondences between features in different views and to account for any distortions or variations caused by the cameras. Calibration techniques may involve using known calibration patterns or performing geometric computations using scene features.

Two or more point correspondences are detected between the overlapping (FOV) images at block 504. The point correspondences may be key points, corners, or regions with unique characteristics that can be reliably detected and described. Common feature detection algorithms include Harris corner detection, FAST (Features from Accelerated Segment Test), or Scale-Invariant Feature Transform (SIFT). These algorithms analyze image properties such as intensity gradients, corners, or scale-space representations to identify salient features. After detecting the features in each image, a descriptor is computed for each feature. The descriptor is a compact representation that captures the local appearance and geometric properties of the feature. Descriptors, such as SIFT, SURF, or ORB, encode information about the intensity, gradient, or texture around the feature. The descriptors are designed to be robust to variations in lighting, scale, and viewpoint. The aim is to generate distinctive feature representations that can be matched accurately between the first and second images.

With the computed feature descriptors, the next step is to establish correspondences between the features in the images with overlapping FOVs. This is done using the homography matrices described above with respect to FIGS. 2-4. At step 506, a set of homography matrices is generated which is used to represent the transformation between the images. The method further normalizes and optimizes by accounting for rotational and offset differences between the first and second images.

At block 508, the method 500 generates, based on the homography matrices, a single virtual focal plane. The homography transformation maps the coordinates of each image onto a common coordinate system (can be corresponding to one of the cameras within the camera array, or an arbitrary virtual camera), aligning them accurately. Each pixel in the image is transformed based on the corresponding homography matrix, determining its new position in the composite image. This is done by utilizing an image warping method and involves resampling the pixels of the images based on the new coordinates determined by the homography transformation. Interpolation techniques, such as bilinear or bicubic interpolation, are commonly used to estimate pixel values at non-grid positions. Once the blending is complete, the resulting composite image represents a single virtual focal plane that combines the contents of the images. The composite image covers a larger field of view, effectively extending the original focal plane. The alignment achieved through the homography transformation and the seamless blending of the warped image enable a cohesive and visually pleasing representation.

Figure 6:
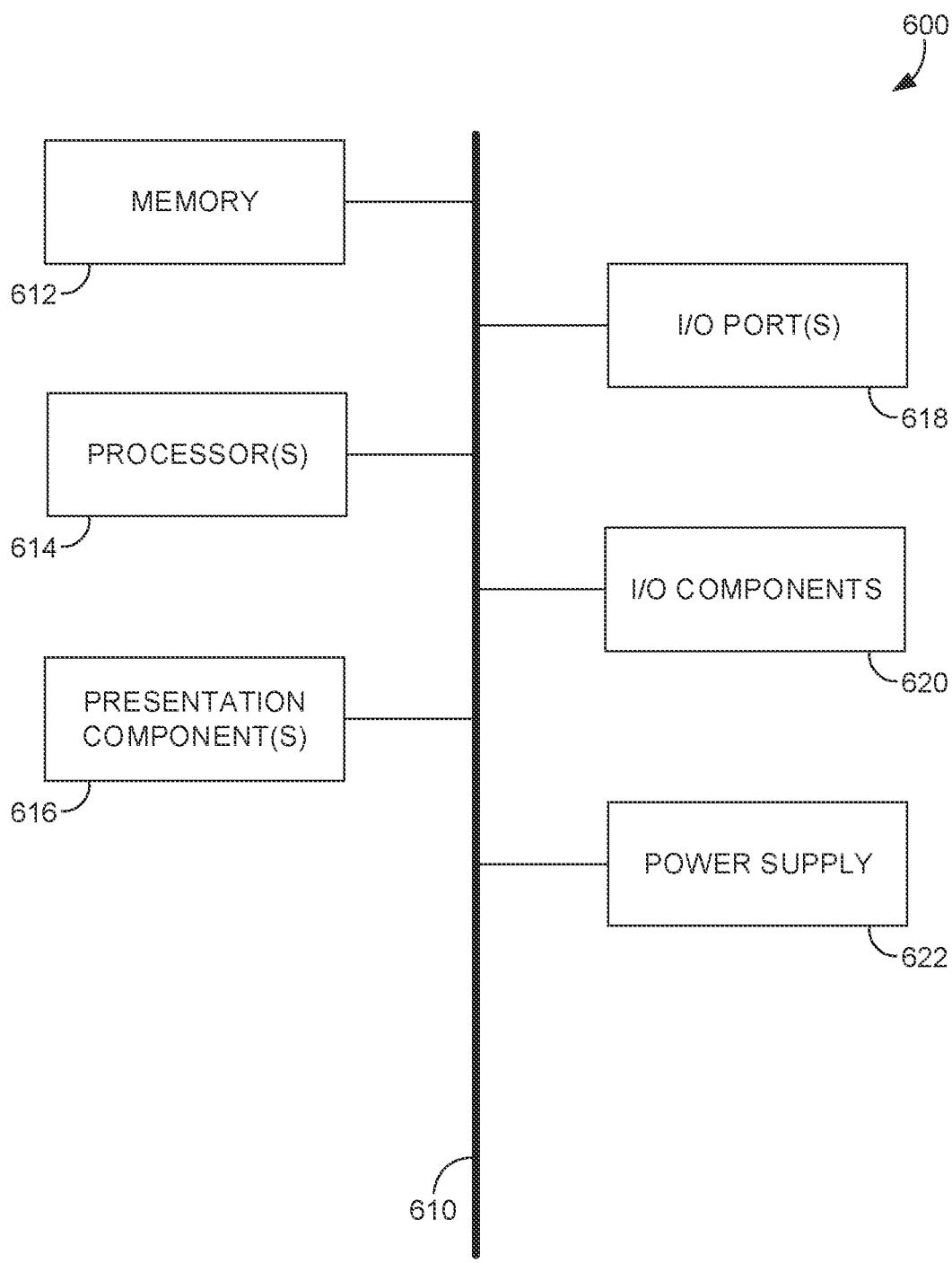
FIG. 6 is an example computing device suitable for implementing aspects of the described technology, in accordance with an aspect described herein.

Having described an overview of embodiments of the present technology, an example operating environment in which embodiments of the present technology may be implemented is described below in order to provide a general context for the various aspects. Referring initially to FIG. 6, in particular, an example operating environment for implementing embodiments of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With continued reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more busses (such as an address bus, data bus, or combination thereof).

Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. This is the nature of the art, and it is reiterated that the diagram of FIG. 6 merely illustrates an example computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters" using communication media described herein. Also, the word "initiating" has the same broad meaning as the word "executing or instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to a image stitching system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and sub-combinations are of utility and may be employed without reference to other features and sub-combinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A system for image stitching to generate a single virtual focal plane image mosaic, the system comprising:
   a flexible multi-camera array;
   at least one processor; and
   one or more computer storage media storing computer executable instructions that, when executed by the at least one processor, cause the at least one processor to perform operations comprising:
   receiving, from the flexible multi-camera array, a first camera image from a first camera of the flexible multi-camera array and a second camera image from a second camera of the flexible multi-camera array, the first camera image and the second camera image having a first narrow overlap portion;
   detecting two point correspondences between the first camera image and the second camera image within the first narrow overlap portion;
   generating an infinite homography transformation matrix for the first camera image and the second camera image using dynamic homography, wherein the infinite homography transformation matrix comprises 3-degrees of freedom to align the first camera image and the second camera image; and
   based on the infinite homography transformation matrix, generating the single virtual focal plane image mosaic, wherein the single virtual focal plane image mosaic has a field of view that is larger than a first field of view of the first camera, or a second field of view of the second camera.

2. The system of claim 1, wherein the first camera image and the second camera image are captured synchronously, and wherein the infinite homography transformation matrix is refined through optimization of a relative rotation of each camera in the flexible multi-camera array to improve accuracy.

3. The system of claim 1, wherein the infinite homography transformation matrix is applied to transform the second camera image into a coordinate system of the first camera image through perspective warping.

4. The system of claim 1, wherein transformation of the second camera image includes applying interpolation techniques to estimate pixel values at non-grid positions.

5. The system of claim 1, the operations further comprising performing image blending techniques to merge the first camera image and second camera image in the single virtual focal plane image mosaic, wherein the first narrow overlap portion is minimal such that a size of the single virtual focal plane image mosaic is nearly equal to a sum of a first size of the first camera image and a second size of the second camera image.

6. The system of claim 1, wherein the flexible multi-camera array comprises a plurality of cameras with rigid and/or non-rigid positioning and orientation relative to one another.

7. The system of claim 6, wherein the single virtual focal plane image mosaic is generated by aligning and blending multiple images captured by the plurality of cameras in the flexible multi-camera array based on their corresponding infinite homography matrices between pairs of cameras having a narrow overlap field of view.

8. The system of claim 1, further comprising receiving a third image and a fourth image from the flexible multi-camera array.

9. The system of claim 8, further comprising detecting two or more point correspondences between any pair of narrowly overlapping camera images, wherein the flexible multi-camera array comprises more than two cameras.

10. The system of claim 8, further comprising generating additional infinite homography matrices for each narrowly overlapping pair of camera images received from the flexible multi-camera array.

11. One or more computer storage media storing computer-executable instructions that, when executed by a processor, cause the processor to perform a method for generating a single virtual focal plane image mosaic, the method comprising:
receiving from a flexible multi-camera array, a first camera image from a first camera of the flexible multi-camera array and a second camera image from a second camera of the flexible multi-camera array, the first camera image and the second camera image having a first narrow overlap portion;
detecting two point correspondences between the first camera image and the second camera image within the first narrow overlap portion;
generating an infinite homography transformation matrix for the first camera image and the second camera image using dynamic homography, wherein the infinite homography transformation matrix comprises 3-degrees of freedom to align the first camera image and the second camera image; and
based on the infinite homography transformation matrix, generating the single virtual focal plane image mosaic, wherein the single virtual focal plane image mosaic has a field of view that is larger than a first field of view of the first camera, or a second field of view of the second camera.

12. The one or more computer storage media of claim 11, wherein the flexible multi-camera array comprises a plurality of cameras with rigid and/or non-rigid positioning and orientation relative to one another.

13. The one or more computer storage media of claim 11, wherein the single virtual focal plane image mosaic is generated by aligning and blending each narrow overlap pair of camera images received from the flexible multi-camera array by generating additional infinite homography matrices.

14. The one or more computer storage media of claim 11, further comprising receiving a third camera image from a third camera of the flexible multi-camera array and a fourth image from a fourth camera of the flexible multi-camera array.

15. The one or more computer storage media of claim 14, further comprising detecting two point correspondences between any pair of narrowly overlapping camera images received from the flexible multi-camera array.

16. The one or more computer storage media of claim 15, further comprising generating additional infinite homography matrices for each narrowly overlapping pair of camera images received from the flexible multi-camera array.

17. A method for generating a single virtual focal plane image mosaic, the method comprising:
receiving from a flexible multi-camera array, a set of camera images comprising a first camera image from a first camera of the flexible multi-camera array, a second camera image from a second camera of the flexible multi-camera array, a third camera image from a third camera of the flexible multi-camera array, and a fourth camera image from a fourth camera of the flexible multi-camera array;
detecting two point correspondences within each narrowly overlapping portion between a first pair of the first camera image and the second camera image, a second pair of the second camera image and the third camera image, a third pair of the third camera image and the fourth camera image, and a fourth pair of the fourth camera image and the first camera image;
generating an infinite homography transformation matrix for each of the first pair, the second pair, the third pair, and the fourth pair of the set of camera images using dynamic homography, wherein the infinite homography transformation matrix comprises 3-degrees of freedom to align each of the first pair, the second pair, the third pair, and the fourth pair of the set of camera images; and
based on the infinite homography transformation matrix, generating the single virtual focal plane image mosaic, wherein the single virtual focal plane image mosaic has a field of view that is larger than a first field of view of the first camera, or a second field of view of the second camera, or a third field of view of the third camera, or a fourth field of view of the fourth camera.

18. The method of claim 17, wherein the flexible multi-camera array comprises a 2 by 2 configuration, and wherein the infinite homography transformation matrix is refined through optimization of a relative rotation of each of the first camera, the second camera, the third camera, and the fourth camera in the flexible multi-camera array.

19. The method of claim 17, wherein the infinite homography transformation matrix is applied to transform the second camera image into a coordinate system of the first camera image through perspective warping.

20. The method of claim 19, wherein transformation of the second camera image includes applying interpolation techniques to estimate pixel values at non-grid positions.

* * * * *